United States Patent [19]

Lang

[11] Patent Number: 5,624,699
[45] Date of Patent: Apr. 29, 1997

[54] EXTRACTION METHOD

[75] Inventor: Timothy R. Lang, Pymble, Australia

[73] Assignee: Processing Technologies International Ltd., Hamilton, Bermuda

[21] Appl. No.: 469,010

[22] Filed: Jun. 5, 1995

Related U.S. Application Data

[63] Continuation-in-part of Ser. No. 185,794, filed as PCT/AU92/00368 Jul. 21, 1992, abandoned.

[30] Foreign Application Priority Data

Jul. 22, 1991 [AU] Australia .................. PK7363

[51] Int. Cl.$^6$ ...................................... A23F 5/24
[52] U.S. Cl. .................. 426/425; 426/431; 426/432; 426/433; 426/594; 426/655
[58] Field of Search ........................... 426/594, 655, 426/432, 433, 507, 425, 431

[56] References Cited

U.S. PATENT DOCUMENTS

| | | | |
|---|---|---|---|
| 2,515,730 | 7/1950 | Ornfelt | 99/71 |
| 3,655,398 | 4/1972 | Pitchon et al. | 99/71 |
| 3,995,067 | 11/1976 | Marsh et al. | 426/432 |
| 5,043,178 | 8/1991 | Gottesman et al. | 426/432 |

FOREIGN PATENT DOCUMENTS

| | | |
|---|---|---|
| 23858/77 | 4/1976 | Australia . |
| 72358/88 | 7/1980 | Australia . |
| 72358/81 | 4/1985 | Australia . |
| 2028753 | 10/1970 | France . |
| 1902690 | 8/1970 | Germany . |
| 2056082 | 5/1971 | Germany . |
| 644483 | 10/1950 | United Kingdom . |
| 914473 | 1/1963 | United Kingdom . |
| 83/02570 | 8/1983 | WIPO . |

*Primary Examiner*—Anthony J. Weier
*Attorney, Agent, or Firm*—Millen, White, Zelano, & Branigan, P.C.

[57] ABSTRACT

A process for extraction of a soluble component from a dried food material, which process includes:

providing:
- a dried food material to be extracted,
- an extracting liquid, and
- an enriching liquid consisting essentially of a solution of the soluble component to be extracted;

forming a pool of the enriching liquid at a lower end of a counter current extractor including a rotary screw conveyor mounted within an inclined or vertical housing;

feeding the dried food material into the lower end of the counter current extractor to contact the pool of enriching liquid wherein enriching liquid is absorbed by the dried food material to form a hydrated, enriched food material;

conveying the hydrated, enriched food material upwardly toward an upper end of the counter current extractor by means of the rotary screw conveyor whilst contacting the hydrated, enriched food material with the extracting liquid which is fed into the other end of the counter current extractor and flows downwardly under gravity to join the pool of enriching liquid;

wherein the residence time of the food material in the pool enriching liquid is essentially no longer than the time taken to hydrate the dried food material.

25 Claims, 3 Drawing Sheets

EXTRACTION METHOD

This application is a Continuation-In-Part of application Ser. No. 08/185,794, filed as PCT/AU92/00368 Jul. 21, 1992, now abandoned claiming priority of Australian application PK 7363, filed Jul. 22, 1991, both of these applications being incorporated herein by reference.

The present invention relates to an improved method of counter current extraction of soluble components from a solid.

U.S. Ser. No. 08/185,794, ("the parent specification") reveals an improved method of counter current extraction in which there is provided a process for extraction of a soluble component from a food material which process includes:
providing:
a food material to be extracted,
an extracting liquid, and
an enriching solution of the soluble component to be extracted;
contacting the food material and enriching solution to obtain an enriched food material; and
contacting the enriched food material with the extracting liquid in counter-current flow.

In that invention, the counter current extraction takes place in a counter current extractor including a rotary screw conveyor mounted within an inclined or vertical elongate housing having an upper end and a lower end such that food material is fed into a lower end of the housing to contact the enriching solution which forms a pool at the lower end of the housing, the food material then being carried upward by the rotating screw in counter-current to the extracting liquid which is fed into an upper end of the housing and flows downward under gravity.

It has now been found that a further step in the process leads to an improvement in the end product of the extraction process when extracting a dried food material according to this embodiment of the parent specification.

According to a first aspect of the present invention, there is provided a process for extraction of a soluble component from a dried food material, which process includes:
providing:
a dried food material to be extracted,
an extracting liquid, and
an enriching liquid consisting essentially of a solution of the soluble component to be extracted;
forming a pool of enriching liquid at a lower end of a counter current extractor including a rotary screw conveyor mounted within an inclined or vertical housing;
feeding the dried food material into the lower end of the counter current extractor to contact the pool of enriching liquid wherein enriching liquid is absorbed by the dried food material to form a hydrated, enriched food material;
conveying the hydrated, enriched food material upwardly toward an upper end of the counter current extractor by means of the rotary screw conveyor whilst contacting the hydrated, enriched food material with the extracting liquid which is fed into the upper end of the counter current extractor and flows downwardly under gravity to join the pool of enriching liquid;
wherein the residence time of the food material in the pool of enriching liquid is essentially no longer than the time taken to hydrate the dried food material.

The dried food material is preferably one in which cell walls are no longer intact or organised. The food material may be subjected to a crushing or grinding step. Particularly preferred food materials are coffee, tea, tobacco, almond hulls, vanilla and other dried flavour and fragrance materials. By "dried", it is meant that the liquid content of the food material has been reduced, either by heating, pressing, vaccuum drying or any other means.

The extracting liquid is preferably water.

The concentration of said soluble component in the enriching solution is preferably greater than that which can be achieved in the extracting liquid when extraction with the extracting liquid is carried out without first contacting the food material with the enriching solution.

It is particularly preferred that the concentration of said soluble material in the enriching solution is greater than the concentration of the soluble component in the unextracted food material. Thus the enriching solution may be an aqueous solution in which the soluble component is at a greater concentration than it is in the unextracted food material.

The counter current extractor used in accordance with the invention may be of the type described in Australian Patent No. 543184. Preferably the reversal of the screw conveyor occurs less than every 20 seconds and preferably less than every 15 seconds.

The liquid extract discharged from a counter current extractor may be diverted through an independent heat exchanger and recirculated. Preferably the recycle is taken from a pool of concentrated solution.

It is particularly preferred that the concentration of the pool is greater than the discharge soluble component concentration which may be achieved by operating the extractor under the same conditions without enrichment. For example, where coffee is being extracted the pool of concentrated solution may be established by the addition of a concentrate which may for example be a dried and ground coffee beans, more preferably a freeze dried coffee, or other coffee product commonly referred to as instant coffee, which may be in the form of a concentrated solution. By a single addition of instant coffee to achieve a concentration in the pool of at least 25° Brix and preferably at least 30° Brix further extraction occurs enabling liquid having a concentration over 20° Brix to be continuously achieved. Under conventional techniques it is generally not possible to achieve a concentration of over about 15° Brix by extracting with water. The limit for counter current extraction without enrichment is about 20° Brix.

It is generally preferred that the extractor is provided with means for ensuring a predetermined extracting liquid level in the lower region of the housing. Preferably the recycled extracting liquid is taken continuously from a pool of liquid established at the bottom of the machine.

In a preferred embodiment said soluble component is added to said pool of enriching liquid and fresh extraction liquid is continuously introduced. Preferably the concentration of said soluble component in the pool of enriching liquid is greater than the concentration which may be achieved using the extracting liquid under the same conditions.

The time necessary to hydrate the dried food material, and hence the residence time in the pool of enriching liquid is dependant upon many factors, including the type of food material, the extent to which the food material has been crushed or ground and the degree of drying which has occurred. For some food materials, such as coffee, the type or blend of coffee can also be a factor. Whilst some dried food materials require considerably longer hydration periods, generally it has been found that 30 minutes is sufficient time to hydrate the dried food material. Preferably, the hydration time is 15 minutes.

It is preferred that the temperature of the extracting liquid is in the range of from approximately 50° C. to 80° C. although higher or lower temperatures may be used if desired.

We have found that there is a significant improvement in the efficiency of extraction, particularly for coffee, when using the method of the invention at a temperature of at least approximately 50° C.

The efficiency of extraction is also determined to some extent by the ratio of the inputs of fresh extracting liquid feed and solid fees. Preferably the ratio of liquid feed to solid feed is in the range of from approximately 1:10 to 10:1.

A more preferred ratio, particularly when the solid hydrates to some extent such as in the use of coffee, is in the range of from approximately 1:1 to 5:1. A ratio of about 3:1 has been found to be particularly suitable for coffee.

Generally it is preferred where liquid is recycled that the recycle rate is greater than half the liquid feed rate and preferably at least the same as the feed rate. Most preferably the recycle is at least twice the liquid feed rate. The product produced by the process of the present invention is an enriched feed.

Whilst not wishing to be bound to a particular theory of operation, it is believed that simultaneously with the uptake of liquid, soluble coffee is being released into the pool liquid. (Because the coffee is both dried and ground then at the point of entry it is to be expected that some coffee will be extracted).

Provided that the residence time of the ground coffee in the pool is not substantially larger than the time during which liquid is being absorbed (the wetting time) then there will be no tendency for the concentration of solubles in the bean and in the coffee extract entering the pool to equilibrate. Because they have not equilibrated, the difference in concentration between the solubles in the extraction liquid and the solubles in the bean provide the driving force for mass transfer in the section above the pool where the 2 phases are truly flowing counter current.

If ground coffee is extracted using water as a solvent then the dried coffee beans will absorb twice their own weight of water so that each 100 gms of beans containing 25 gms of soluble coffee will absorb 200 gms of water. Therefore, at start up the concentration of soluble coffee in the liquid phase of the hydrated bean will be 12.5%.

As the extraction process proceeds, dried coffee entering the CCE will absorb extract of increasing concentration and hence will in turn provide an extract of increasing concentration until an equilibrium is established. This equilibrium would be expected to be around 12°–15° Brix (12–15%) and this is borne out by commercial experience when using both the continuous screw conveyor and batch-type.

If a pool of concentrated coffee extract, say at 25° Brix, is established at the lower end of a continuous screw conveyor extractor at start up and the same operating conditions are maintained in terms of coffee feed rate and extraction water feed rate then it would reasonably be expected that at start up the extract would be at 25° Brix and this concentration would fall to 12.5% over time. Surprisingly this is not the case.

The very high concentration of the extract from the present extraction process allows the elimination of a pre-concentrations step using evaporators (12° Brix to 40° Brix) before spray drying or freeze drying. Thus, a dried product with a significantly higher content of aroma compounds normally lost during evaporation may be produced.

The invention will now be further described with reference to the drawings in which.

Figure 1:
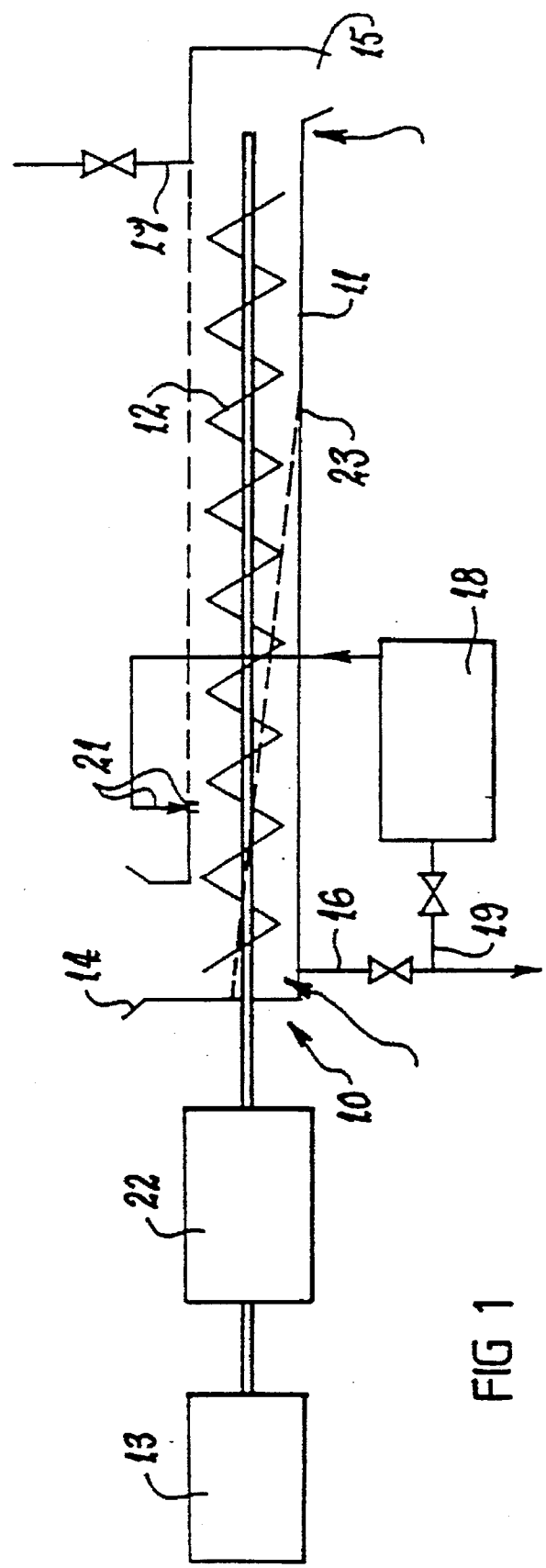
FIG. 1 is a schematic diagram of a counter current extractor.

As seen in FIG. 1 the counter current extractor 10 comprises an elongate trough shaped housing 11 in which is disposed a screw conveyor 12 which is arranged to be rotated about its longitudinal axis by drive means 13. The housing 11 is provided with an inlet hopper 14 for the introduction of material to be extracted. The hopper 14 is disposed above the lower end of the screw which is inclined slightly upwardly towards an outlet spout 15 for the solid material which has been treated. A discharge line 16 is provided for the discharge of the extracting liquid which is charged into the housing 11 through charging line 17. A heat exchanger 18 is provided on a bypass line 19 to heat discharged liquid and to return it through nozzle 21 to the lower end of the housing 11 to heat the material being treated.

Under operating conditions disclosed in Australian Patent No. 543 184 food material is introduced to the hopper 14 and passes into the lower end of the extractor 10 and is carried by a single screw 12 toward outlet spout 15 where extracted material is deposited. Extracting liquid is introduced through the charging line 17 and flows under gravity toward the end adjacent the hopper 14.

A pool of extracting liquid 23 containing extracted soluble material is maintained at a constant level 23 by drawing off liquid extract. A portion of the liquid extract is recycled via recycle line 19, a heat exchanger 18 and reintroduced through nozzle 21.

When operating using coffee as the food material the extractor may be provided with a heated jacket at about 90° C. to provide an extracting liquid temperature of about 50° C.

Under such conditions a steady-state is achieved where a pool concentration of about 12°–15° Brix is provided.

In a counter current solid-liquid extractor the concentration of solubles in both the solid and liquid phases will reach a steady-state.

At steady-state the concentration of solubles in the solid phase will exceed the concentration in the liquid phase. This concentration difference provides the driving force to transfer the solubles from the solid to the liquid.

Figure 2:
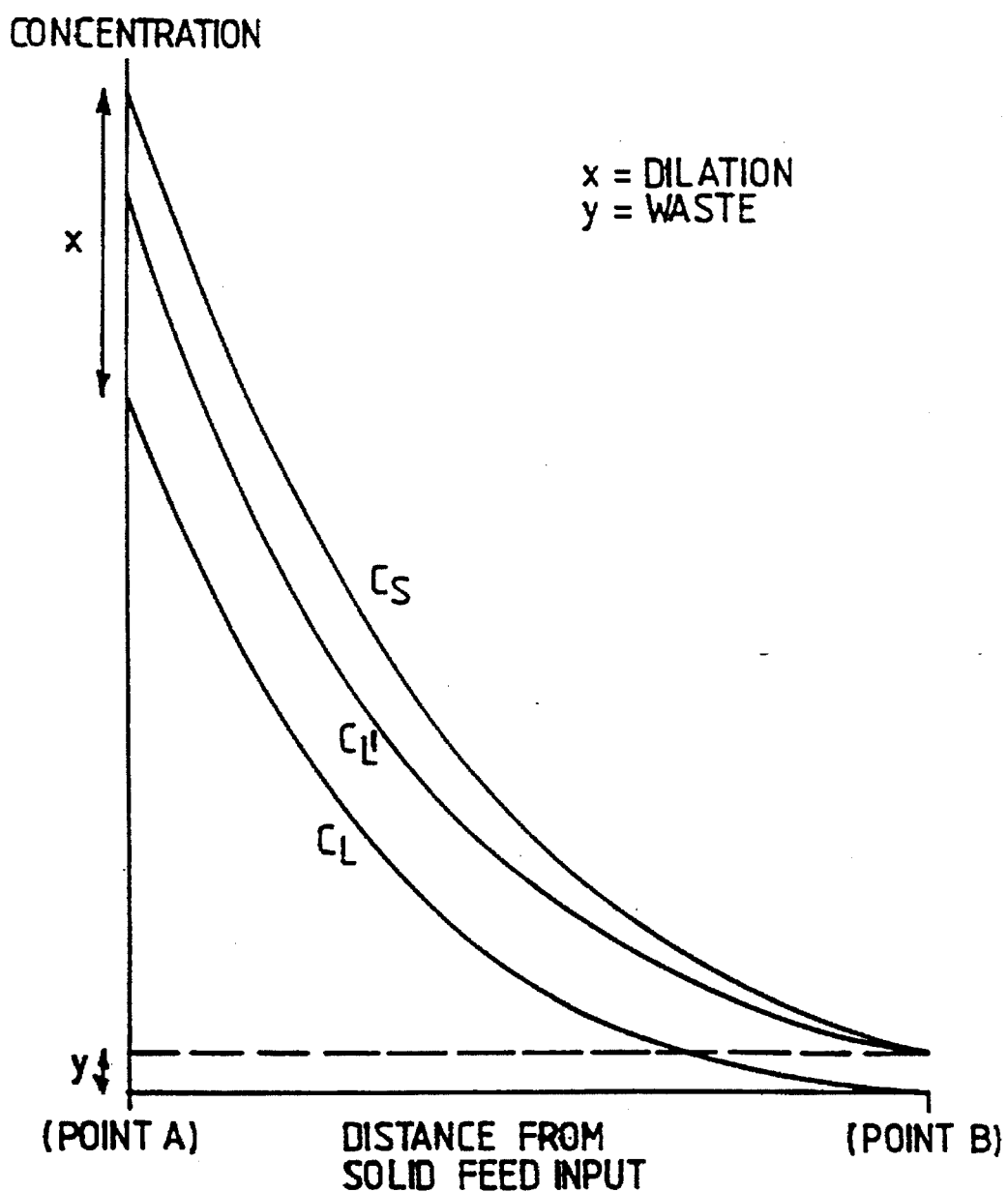
FIG. 2 is a graph which compares concentration profiles of a counter current extractor operating in accordance with the invention with the corresponding extracting operating without enrichment.

Typical concentration profiles for the solid and liquid phases are shown in FIG. 2 where $C_s$ represents a typical concentration profile of solute in the solid phase, $C_l$ represents a typical concentration of solute in the liquid phase, and $C_l'$ represents a changed concentration profile in the liquid phase brought about by artificially lifting $C_s$ by enrichment at the point of entry of the solid phase of the machine in accordance with the method of the invention. These concentration profiles reflect the laws governing diffusion and mass transfer. For diffusion the material diffused (dm) is determined by the relationship $$dm = qDAdt(dc/d_x),$$

the mass transfer ds is provided by the relationship $$ds = kAdt(C_s - C_l).$$

It is to be expected that if a concentration of solubles in the liquid phase 4 was induced to exceed the concentration of solubles in the solid phase, then a condition is established whereby solubles will transfer from the liquid phase back into the solid phase.

In the present invention however when the concentration of solubles in the liquid phase at point A in FIG. 1 is raised above the proportion of solubles in the solid phase as a percentage of total weight (for example by addition of a concentrate to the lower end of the machine) surprisingly then that induced high concentration can be maintained or increased even though fresh extracting solvent is introduced.

The waste therefore remains low and dilution is reduced as shown in FIG. 2 by comparison of $C_l$ and $C_l'$ profiles.

Figure 3:
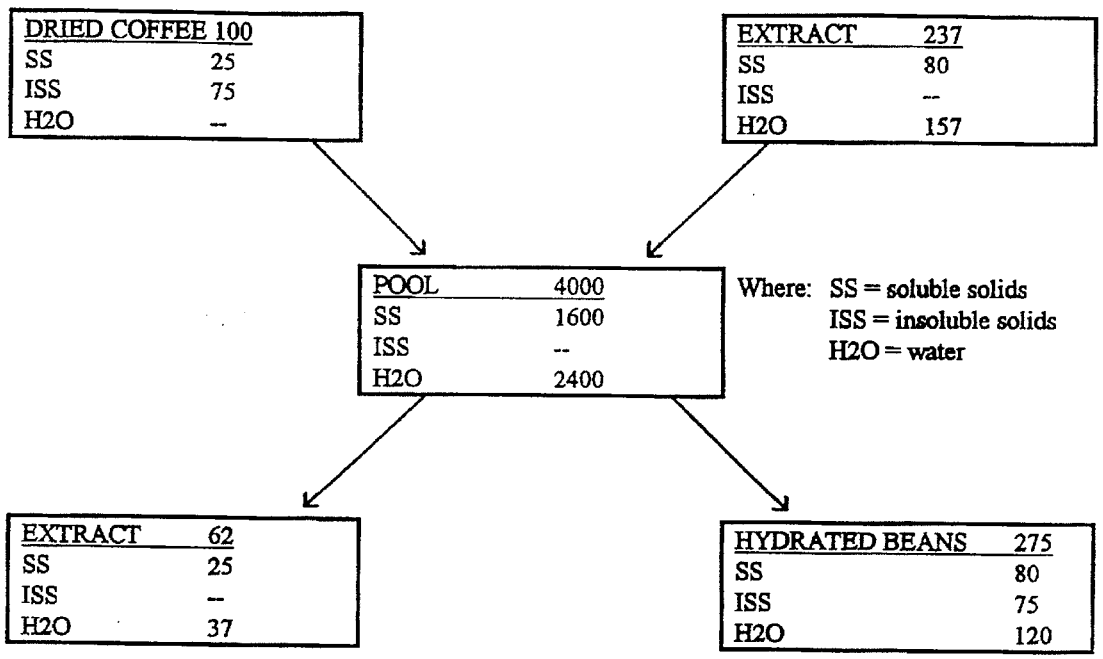
FIG. 3 is a mass flow diagram showing the effect of the pool of enriching liquid at approximately 40° Brix.
Figure 4:
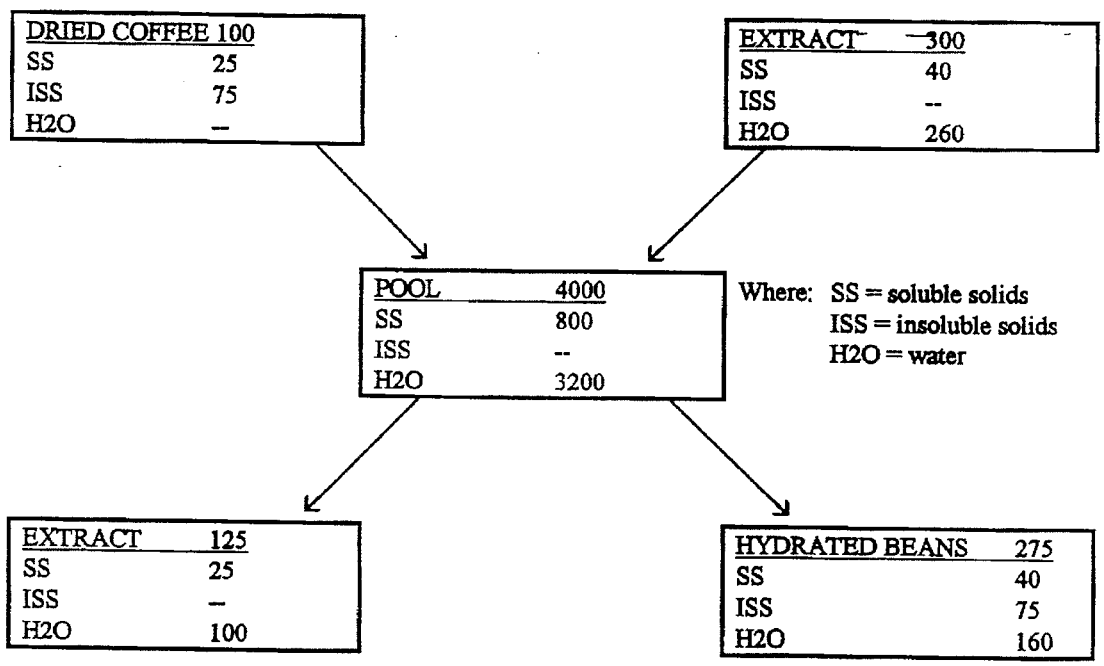
FIG. 4 is a mass flow diagram showing the effect of the pool of enriching liquid at approximately 20° Brix.

In FIG. 3, the net effect of the pool only is to concentrate the extract entering the pool from 33% soluble solids to the extract leaving the pool at 40% and to enrich the soluble solids content of the dried coffee from 25% to 52% of total dried weight and add 120% of water, (ie. 120 g water to 100 g dried coffee). As the hydrated bean emerges from the pool, the entrained liquid contains 40% soluble solids. The bean then enters the portion of the extractor providing true counterflow at this enriched level of soluble solids and the soluble solids are then extracted in accordance with normal diffusion principals, resulting in an extract at significantly higher concentration than from a bean which has not been enriched. In FIG. 4, the effect of the pool only is to concentrate the extract entering the pool from 13% to extract leaving the pool at 20% and to enrich the soluble solids content of the dried coffee from 25% to 35% of total dried weight and add 160% of water, (ie. 160 g water to 100 g dried coffee). Again the bean is enriched upon leaving the pool, resulting in higher concentration extracts.

To achieve these results, the residence time of the ground coffee in the pool is kept to less than the hydration time. This is done by controlling the level of the pool, as well as conveyor screw speed, time of forward motion and time of reverse motion of the screw. The use of a rotary screw conveyor counter current extractor is an integral part of this process, as it allows the necessary degree of control over the hydration time in the pool. A further advantage of the process is that it allows simple control of the concentration of the end product extract simply by changing the concentration of the enriching liquid in the pool at start up.

It is to be understood that various other modifications and/or alterations may be made without departing from the spirit of the present invention as outlined above.

I claim:

1. A process for extraction of a soluble component from a food material which process includes;
   providing:
   a food material having a soluble component to be extracted;
   an extracting liquid; and
   an enriching solution of the soluble component to be extracted, said enriching solution having a higher concentration of said soluble component than said food material to be extracted;
   contacting the food material with the enriching solution to obtain an enriched food material; and
   contacting the enriched food material with the extracting liquid in counter current flow,
   wherein the contacting steps are conducted in a counter current extractor including a rotary screw conveyor mounted within an inclined or vertical elongate housing having an upper end and a lower end such that the food material is fed into a lower end of the housing to contact the enriching solution which forms a pool at the lower end of the housing such that the food material contacts the enriching solution upon being fed into the lower end of the housing, the food material then being carried upward by the rotating screw to contact the extracting liquid which is fed into an upper end of the housing and flows downward under gravity, and wherein in the pool the concentration of solubles in the food material and the concentration of solubles in the extraction liquid are not equilibrated thereby providing a driving force for mass transfer above the pool where the food material and extracting liquid are flowing counter current.

2. A process according to claim 1 wherein the food material is a dried flavour and fragrance material selected from coffee, tea, tobacco, almond hulls and vanilla.

3. A process according to claim 2 wherein the food material is subjected to a crushing or grinding step.

4. A process according to claim 1 wherein the extracting liquid is water.

5. A process according to claim 1 wherein the weight ratio of extracting liquid to food material is in the range of approximately 1:10 to 10:1.

6. A process according to claim 1 wherein the food materials are dried and ground coffee beans and the enriching solution is an aqueous solution of coffee at a concentration of at least approximately 25° Brix.

7. A process according to claim 6 wherein the process is conducted at a temperature of at least approximately 50° C.

8. A process according to claim 6 wherein the weight ratio of dried and ground coffee beans to extracting liquid is in the range of approximately 1:1 to 5:1.

9. A process according to claim 8, wherein the dried and ground coffee beans are fed to the counter current extractor at a rate of approximately 50–160 gm/min, the extraction water feed rate is approximately 180 to 250 ml/min and the volume of the pool of enriching liquid is 3 to 6 liters.

10. A process according to claim 1, wherein the concentration of soluble solids in extracting liquid withdrawn from the counter current extractor is from approximately 25° to 40° Brix.

11. A process for extraction of a soluble component from a dried food material, which process includes;
    providing;
    a dried food material having a soluble component to be extracted,
    an extracting liquid, and
    an enriching liquid consisting essentially of a solution of the soluble component to be extracted, said enriching liquid having a higher concentration of the soluble material to be extracted than said dried food material to be extracted;
    forming a pool of the enriching liquid at a lower end of a counter current extractor including a rotary screw conveyor mounted within an inclined or vertical housing;
    feeding the dried food material into the lower end of the counter current extractor to contact the pool of enriching liquid wherein enriching liquid is absorbed by the dried food material to form a hydrated, enriched food material;
    conveying the hydrated, enriched food material upwardly toward an upper end of the counter current extractor by means of the rotary screw conveyor whilst contacting the hydrated, enriched food material with the extracting liquid which is fed into the other end of the counter current extractor and flows downwardly under gravity to join the pool of enriching liquid;
    wherein the residence time of the food material in the pool of enriching liquid is essentially no longer than the time taken to hydrate the dried food material.

12. A process according to claim 11 wherein the dried food material is a flavour and fragrance material selected from coffee, tea, tobacco, almond hulls and vanilla.

13. A process according to claim 12 wherein the food material is subjected to a crushing or grinding step.

14. A process according to claim 11 wherein the extracting liquid is water.

15. A process according to claim 11 wherein the residence time of the food material in the pool of enriching liquid is no more than approximately 30 minutes.

16. A process according to claim 11 wherein the residence time of the food material in the pool of enriching liquid is no more than approximately 15 minutes.

17. A process according to claim 11 wherein the weight ratio of extracting liquid to food material is in the range of approximately 1:10 to 10:1.

18. A process according to claim 11 wherein the food materials are dried and ground coffee beans and the enriching solution is an aqueous solution of coffee at a concentration of at least approximately 25° Brix.

19. A process according to claim 11 wherein the process is conducted at a temperature of at least approximately 50° C.

20. A process according to claim 18 wherein the weight ratio of dried and ground coffee beans to extracting liquid is in the range of approximately 1:1 to 5:1.

21. A process according to claim 18, wherein the dried and ground coffee beans are fed to the counter current extractor at a rate of approximately 50 to 160 g/min, the extraction water feed rate is approximately 180 to 250 ml/min and the volume of the pool of enriching liquid is 3 to 6 liters.

22. A process according to claim 20, wherein the concentration of soluble solids in extracting liquid withdrawn from the counter current extractor is from approximately 25° to 40° Brix.

23. A process according to claim 22 wherein the concentration of soluble solids in extracting liquid withdrawn from the counter current extractor is controlled by establishing a desired concentration of solubles in the enriching liquid prior to commencing the process.

24. A process according to claim 20, wherein the residence time of the coffee in the pool of enriching liquid is no more than approximately 30 minutes at a temperature of at least approximately 50° C.

25. A process according to claim 24, wherein the residence time of the coffee in the pool of enriching liquid is no more than 15 minutes.

* * * * *